(12) United States Patent
Wu et al.

(10) Patent No.: US 6,573,945 B1
(45) Date of Patent: Jun. 3, 2003

(54) LOGO INSERTION ON AN HDTV ENCODER

(75) Inventors: Siu-Wai Wu, San Diego, CA (US); Robert Nemiroff, Carlsbad, CA (US)

(73) Assignee: General Instrument Corporation, Horsham, PA (US)

( * ) Notice: Subject to any disclaimer, the term of this patent is extended or adjusted under 35 U.S.C. 154(b) by 0 days.

(21) Appl. No.: 09/481,722

(22) Filed: Jan. 12, 2000

(51) Int. Cl.$^7$ .................................................. H04N 7/26
(52) U.S. Cl. ........................ 348/584; 348/581; 348/587; 348/588; 348/589; 345/641
(58) Field of Search ................................ 348/584, 585, 348/586, 589, 597, 598, 600, 587, 588, 590–593, 599, 581; 345/641, 640, 638, 629; H04N 7/26

(56) References Cited

U.S. PATENT DOCUMENTS

| | | | | |
|---|---|---|---|---|
| 5,452,094 A | * | 9/1995 | Ebner et al. | 358/296 |
| 5,488,675 A | * | 1/1996 | Hanna | 382/284 |
| 5,491,517 A | * | 2/1996 | Kreitman et al. | 348/581 |
| 5,543,856 A | * | 8/1996 | Rosser et al. | 348/578 |
| 5,566,251 A | * | 10/1996 | Hanna et al. | 382/284 |
| 5,654,805 A | * | 8/1997 | Boon | 358/426 |
| 5,731,846 A | * | 3/1998 | Kreitman et al. | 348/581 |
| 5,892,554 A | * | 4/1999 | DiCicco et al. | 348/584 |
| 5,953,076 A | | 9/1999 | Astle et al. | |
| 6,100,925 A | * | 8/2000 | Rosser et al. | 348/169 |
| 6,181,743 B1 | * | 1/2001 | Bailleul | 375/240 |
| 6,226,041 B1 | * | 5/2001 | Florencio et al. | 348/473 |
| 6,229,550 B1 | * | 5/2001 | Gloudemans et al. | 345/435 |
| 6,266,100 B1 | * | 7/2001 | Gloudemans et al. | 348/587 |
| 6,373,530 B1 | * | 4/2002 | Birks et al. | 348/584 |

FOREIGN PATENT DOCUMENTS

| | | | | |
|---|---|---|---|---|
| EP | 1148733 A2 | * | 10/2001 | H04N/7/26 |
| WO | WO 01/33861 A1 | * | 5/2001 | H04N/7/26 |
| WO | WO 01/52547 A1 | * | 7/2001 | H04N/7/26 |
| WO | WO 02/19722 A2 | * | 7/2002 | H04N/7/26 |

* cited by examiner

*Primary Examiner*—John Miller
*Assistant Examiner*—Paulos Natnael
(74) *Attorney, Agent, or Firm*—Barry R. Lipsitz; Douglas M. McAllister

(57) ABSTRACT

An encoder and encoding method for inserting logos into a digital television signal. The logo insertion is performed at the front end of the encoder (e.g., prior to compression) by sharing the video capture frame buffer of the encoder, so there is no need for a separate logo inserter with a separate buffer, and encoding cost are reduced. An alpha blending function receives logo image and logo alpha map data for blending with input video data. The input video is retrieved from the frame buffer, and written back to the frame buffer after blending with the logo data. Subsequently, the frame buffer contents are provided to a pre-processing function for filtering and film mode detection. For a film mode frame, a drop field decision is provided from the pre-processing function to the frame buffer to drop the redundant field. The pre-processed video data is then provided for conventional compression processing. In an HDTV embodiment, several compressors are provided which each receive a panel of a video frame.

28 Claims, 2 Drawing Sheets

LOGO INSERTION ON AN HDTV ENCODER

BACKGROUND OF THE INVENTION

The present invention relates to the field of digital television and, in particular, to an encoder and encoding method for inserting logos into a digital television signal. The invention is suitable for use with a High Definition Television (HDTV) encoder or Standard Definition Television (SDTV) encoder.

Most television stations today insert a station logo in the video that is to be broadcasted. It is anticipated that broadcasters will continue this practice in the transition from analog to digital television. Typically, a separate logo inserter is used before a video encoder to blend the logo with the background video image.

However, digital logo inserters are expensive, particularly for HDTV applications.

Accordingly, it would be desirable to provide a digital video encoder with a built-in logo insertion function. In particular, it would be desirable to make use of the spare processing capacity and share the frame buffer memory of the video compression encoder to insert the logo at the front end of the encoder.

The system should provide the capability of inserting a logo at the video encoder while eliminating the need for an expensive logo inserter, thereby enabling broadcasters to implement Digital Television (DTV) at a reduced cost. The system should be compatible with HDTV or SDTV encoders.

The system should further be compatible with existing digital video standards, such as MPEG, ATSC and DVB.

The system should provide dissolves in and out, detelecine operation, and animated logos.

The system should provide virtually any type of inserted logo image, such as a station identifier or other advertisement, or other indicia, such as a graphic indicating news, weather, stock information, sports scores or the like, an Internet hyperlink, a link to an another channel that provides alternative information (sports statistics of a player, or a replay), a link to text information sent to the decoder, and so forth.

The system should blend or overlay the inserted logo with the background image as desired.

The present invention provides an encoder and logo insertion method having the above and other advantages.

SUMMARY OF THE INVENTION

The present invention relates to a method and apparatus for inserting logos into a digital television signal that uses an existing video capture frame buffer of a video encoder to add a logo insertion capability.

An alpha blending function receives logo image and logo alpha map data for blending with input video data. The input video is retrieved from a frame buffer, and written back to the frame buffer after blending with the logo data. Subsequently, the frame buffer contents, including the portion with the blended logo data, are provided to a pre-processing function for filtering and film mode detection. If the frame is determined to be a film mode frame, a drop field decision is provided from the pre-processing function to the frame buffer to drop the redundant field, and no logo insertion is performed for the dropped field.

The pre-processed video data that is output from the pre-processing function is then provided to subsequent compression components for conventional processing, such as motion compensation.

In an HDTV embodiment, a number of compressors are provided which each receive a portion (e.g., panel) of a video frame. The data stored in each frame buffer therefore comprises a corresponding portion of a frame. The logo insertion is performed only in the compressors that correspond to the region of a frame in which the logo is to be provided.

By incorporating the logo insertion into the front end of the encoder/compressors, there is no need for a separate logo inserter. Moreover, further efficiencies are achieved by providing only the portion of the input video data that is involved with the alpha blending to the alpha blending function in accordance with logo coordinate data.

DETAILED DESCRIPTION OF THE INVENTION

The present invention relates to an encoder and encoding method for inserting logos into a digital television signal.

Figure 1:
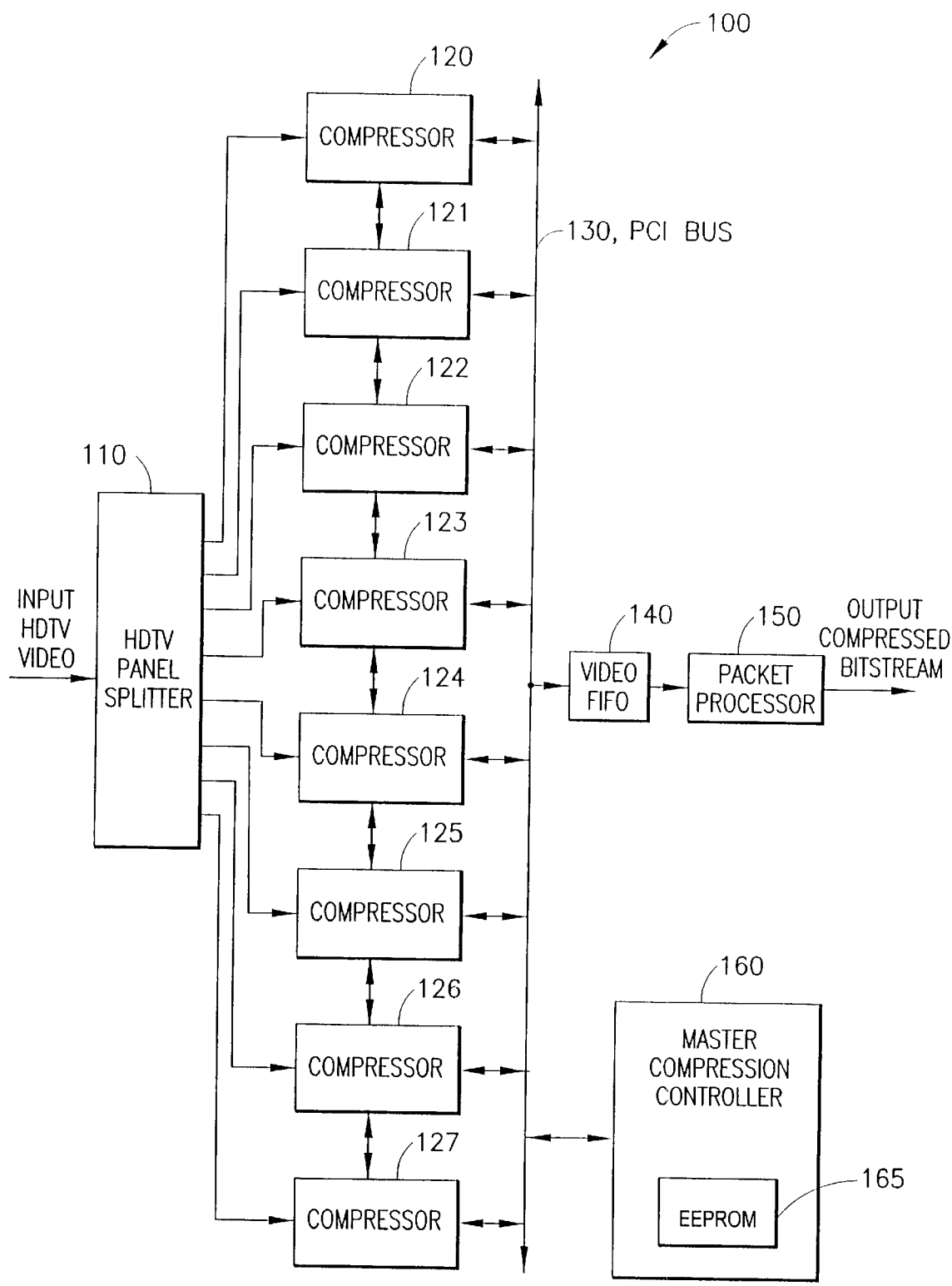
FIG. 1 illustrates an HDTV encoder in accordance with the present invention.

FIG. 1 illustrates an HDTV encoder in accordance with the present-invention. The encoder 100 includes a HDTV panel splitter 110 that receives an input HDTV video stream. The input video may come, e.g., from a live camera, or recorded on a digital VTR, or a. satellite feed from the broadcast television network, or from news gathering truck, or so forth. The DigiCipher II (tm) HDTV encoder, proprietary to General Instrument Corporation, the assignee hereof, is an example of such an encoder 100.

The splitter 110 splits the data among eight separate video compressors (e.g., encoders) 120–127. The compressors 120 communicate with a Peripheral Component Interconnect (PCI) bus 130. A video buffer 140 (such as a first-in, first-out, or FIFO buffer) receives the compressed video data from the bus and provides it to a packet processor 150 to provide an output compressed bitstream. A Master Compression Controller (MCC) 160, which includes an Electrically Erasable Programmable Read-Only Memory (EEPROM) or other non-volatile memory 165, controls the flow of data and coordinates and synchronizes the video compressors 120–127. The MCC may employ the Motorola model MPC860 Power PC controller.

Note that the invention is illustrated in a multi-compressor HDTV embodiment, but can be used with SDTV data as well. Moreover, the use of eight compressors 120–127 is an example only, as any number of compressors may be used.

The input HDTV picture is split into eight panels. Each panel is processed by a video compression engine. The compression engines 120–127 dump the compressed video data into the video buffer 140. The Packet Processor 150 pulls the compressed data from the buffer 140 at a rate determined by the configured output bandwidth, and packetizes the data into MPEG transport packets, for example.

The invention provides a method and apparatus to insert a logo (an image file with alpha map) in the video at the HDTV encoder. The alpha map may have one byte per pixel, where each byte ranges from 0 to 255, representing an alpha value from 0 to 1. One alpha map may be used for both luma and chroma together, or separate alpha maps may be used for luma and chroma. The present invention is therefore not limited to using one alpha map. Moreover, the present invention allows the user to bypass chroma blending (alpha=1 for chroma pixels), which provides a watermark effect.

Features of the invention include:
1. The capability to insert a logo at the video encoder by overwriting the video data in the video capture frame buffer;
2. The capability to split the logo into panels which overlap to fit the parallel processing HDTV encoder architecture;
3. The capability to achieve the effects of dissolving in/out by switching to different pre-calculated alpha maps for consecutive or otherwise successive video frames; and
4. The capability to skip a field to handle alpha blending correctly when partial frames are discarded during detelecine operation.

On the HDTV encoder 100, any available compression engine, such as the DVxpert from C-Cube Microsystems, Inc., Milpitas, Calif., USA, may be used. The panels are preferably overlapped to facilitate the sharing of motion data across the panels.

Logo insertion in a video picture (e.g, frame or field) is achieved by performing the following alpha blending operations on a subset of pixels in the picture:

$$X\_out = \alpha * X\_in + (1-\alpha) * X\_logo;$$

where X_in is the luma (or chroma) pixel value of the input picture, X_logo is the luma (or chroma) pixel value of the logo image, and a (alpha) is a fractional value between 0 to 1 which controls the degree of blending. Moreover, each pixel of the logo image may have a different associated alpha value.

One or more logos can be stored in the non-volatile memory (EEPROM) 165 of the MCC 160. These logos may be downloaded from a controller computer (user interface), e.g., via an Ethernet port that is built into the MCC 160. Each logo consists of four component images, namely luma (Y), blue chroma (Cb), red chroma (Cr), and $_\alpha$. Additionally, every pixel.of each component has 8-bit precision.

Figure 2:
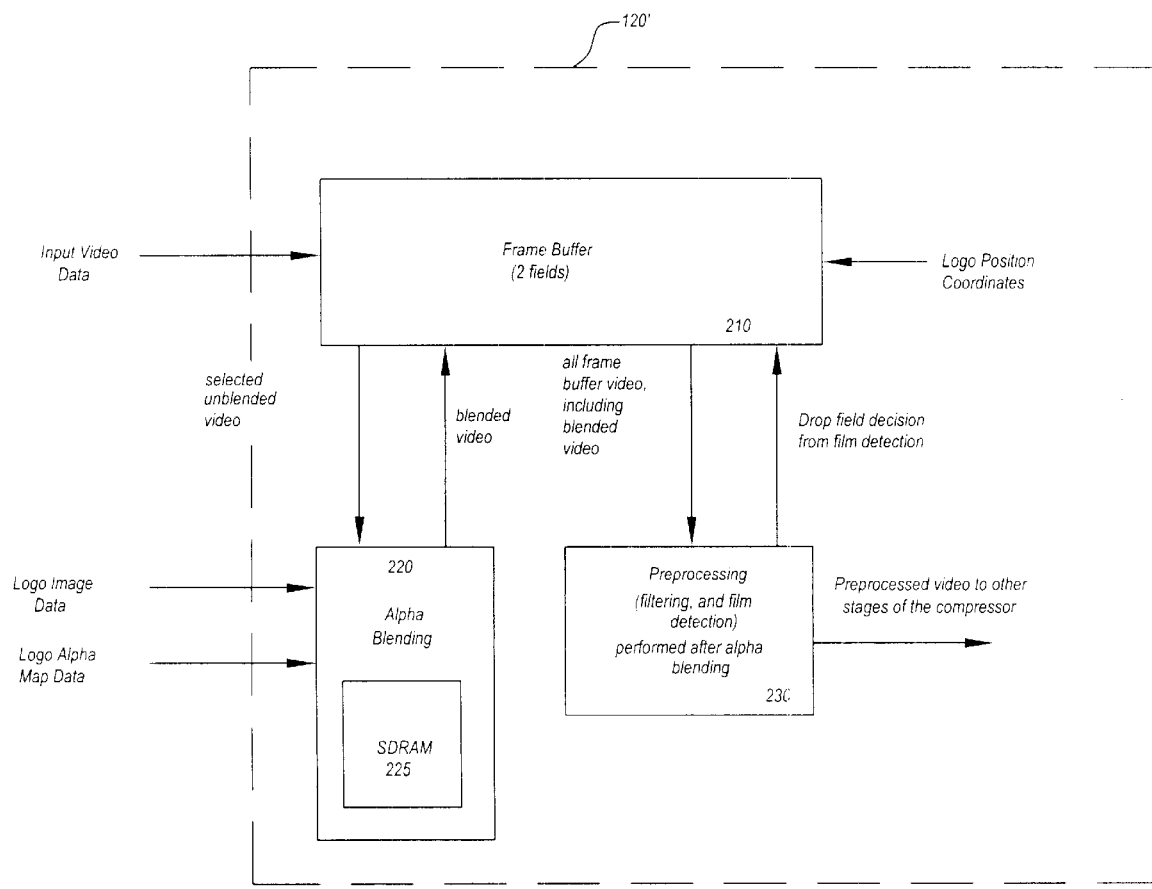
FIG. 2 illustrates an alpha blending operation of an HDTV encoder in accordance with the present invention.

FIG. 2 illustrates an alpha blending operation of an HDTV encoder in accordance with the present invention.

An example compressor/encoder 120' corresponds to the compressor 120 of FIG. 1. In practice, any one or more of the compressors 120–127 receive logo data and perform logo insertion in accordance with the invention.

Acting on commands received from a user, e.g., via an Ethernet or other suitable link, the MCC 160 downloads a set of luma and chroma images, 4 luma alpha maps, and 4 chroma alpha images to the compressor(s) involved in the logo insertion, such as the example compressor 120'. These logo images and alpha maps are stored in respective memories of the compressors, e.g., in an alpha blending circuit/function 220. The memories may be Synchronous Dynamic Random Access Memories (SDRAMs), for example, such as the example SDRAM 225.

Depending on the desired horizontal and vertical (e.g., x,y) coordinates, and size of the logo, each compressor may or may not receive a selected portion of the logo. For each compressor, only the portion of the logo which falls on the picture area covered by that compressor, including any panel overlap area, is received from the MCC 160. The MCC 160 also calculates the coordinate of the logo segment relative to the panel that is processed by the compressor. This relative coordinate is used to control the display location of each logo segment on each compressor such that the output image, after stitching the panels together, will produce the entire logo.

The coordinate of the logo relative to the picture is provided by the user, and is sent by the controller computer to the MCC 160. Based on the picture coordinate, the MCC divides the logo to fit into the panels and calculates the coordinate of each sub-logo within the panel.

The logo position coordinates are provided from the MCC 160 to the frame buffer 210. This information is used to select the video data to retrieve from the frame buffer 210 for the alpha blending operation at the alpha blending function 220.

The luma alpha maps to be downloaded to the compressor (s) involved in logo insertion are calculated by the MCC 160 from the original alpha map by multiplying each element of the alpha map by a scaling factor of, e.g., 1.0, 0.75, 0.5, and 0.25. The original alpha map is the alpha map downloaded by the user, and is stored in the EEPROM 165. This is the alpha map of the logo when it is in a steady state, i.e., when it is not dissolving.

The chroma alpha maps are obtain from the luma alpha maps by horizontal decimation by two, assuming the input video is in YUV color space with a 4:2:2 format. However, other formats may be used.

Any time when logo insertion is enabled, the one or more compressors that are involved in the logo insertion select one of the four alpha maps to be used to blend the luma and chroma values in the alpha blending circuit 220. For example, when it is desired to dissolve a logo into the picture, successively larger values of alpha are selected in consecutive frames. For example, alpha map scaling value may be used in the following sequence: . . . 0, 0.25, 0.5, 0.75, 1.0, . . . Note that the scaling values are not the actual alpha values used in the blending. For a slower dissolve, α can be changed in successive but non-consecutive pictures, e.g., with scaling values in the sequence: . . . 0, 0, 0.25, 0.25, 0.5, 0.5, 0.75, 0.75, 1.0, 1.0 . . .

On the other hand, when it is desired to dissolve a logo out from the picture, successively smaller values of alpha are selected, e.g., with scaling values in the sequence: . . . 1.0, 0.75, 0.5, 0.25, 0, . . . A slower dissolve may also be provided as discussed previously.

Other alpha scaling values may be used. Alternatively, only a single alpha scaling value (1.0) can be used if no dissolve is required.

In the compressor 120', the alpha blending operation is performed on the data in a video capture frame buffer 210 prior to pre-processing (i.e., prior to filtering and film mode detection) at a pre-processing function 230. The alpha-blender 220 retrieves selected input pixel data from the frame buffer, performs the blending operation with the logo data, and overwrites the original pixel data by the blended pixel in the frame buffer 210.

The MCC sends the local compressor the upper left coordinate of the portion of the logo for that compressor. In one possible implementation, the local compressor has a fixed width for the logo (272 pixels) and the height from the MCC is in 4-line units. If the logo does not cover the entire 272×4 block size, the MCC sets the alpha value to 1 to bypass the logo where necessary. These restrictions make the implementation easier, but may not optimize efficiency for smaller sized logos. For a normal (e.g., non-film mode) video input, the frame buffer 210 is replenished by two new input fields for each frame time (e.g., period of one frame) that alpha blending is performed. When film mode is detected for the input video, one field in the frame buffer is dropped every other output frame by sending an appropriate drop field decision signal from the pre-processing function 230 to the frame buffer 210.

Film mode video is obtained from the telecine process by converting 24 frames/sec. movie film to 30 frames/sec. video by scanning every other frame with three fields instead of two. At the compressor 120', the extra field can be dropped in detelecine processing since it is redundant.

When a field is dropped, only one field of the frame buffer is replenished by new input video data, while the other field of the frame buffer keeps the old data which has been blended with the logo. In this case, the alpha blending operation is performed only on the new input field of video data, whereas the old field of video data in the frame buffer remains intact. This is to avoid performing alpha blending twice on the same field of data, which would result in visible flickering.

The pre-processed video is output from the pre-processing function 230 to other stages of the compressor 120' for conventional processing, such as motion compensation, conversion to frequency domain coefficients, and so forth. The compressed data is ultimately provided from each compressor. 120–127 to the video FIFO 140 as indicated in FIG. 1.

A number of variations of the present invention are possible. For example, animated logos can be generated by switching between a set of pre-calculated logo images.

Moreover, while logo insertion in connection with an HDTV encoder has been discussed, logo insertion on an SDTV encoder can be achieved using analogous steps. For SDTV, there may be only one compressor/encoder, in which case the input video to the frame buffer typically comprises the entire frame rather than a split-off panel.

Additionally, any type of logo image can be inserted. The term "logo" or "logo image" as used herein should be construed broadly to encompass any type of graphical device, regardless of whether it includes text.

Additionally, as mentioned, one or more logos can be inserted in a frame.

Furthermore, generally each compressor can be provided with the logo insertion functions discussed herein, although this is not mandatory. For example, if it is known that logo images are only to be provided in a predetermined location in a frame, such as in the lower right corner of the frame, only the compressor(s) that process data from that location need be provided with the logo insertion capability.

Moreover, an existing compressor can be modified/retrofitted to have the logo insertion capability. The logo inserter may be added before or after preprocessing. If added before the preprocessor, there is no special case with film mode, since the logo would be inserted prior to detelecine; however if the logo was very large relative to the original image size, the detelecine algorithm may not detect film mode.

An existing encoder may add the alpha blending function if it has the processing capability to perform the blending function. The alpha blending function reads the input video pixels (X_in), alpha values, and logo pixels (X_logo). Input video is read for only the areas effected (in one case, 272×4 blocks). The alpha function is applied to the data. The new data (X_out) is written back into memory, overwriting X_in. Data from X_in contains the image with the logo and the image goes through the normal encoding process.

Control from the MCC to the blender may include x-coordinate, y-coordinate, alpha map selection, "blending enable" and "chroma blending enable" commands.

An important feature of the invention is that the logo inserter and the video preprocessor share the same frame buffer, hence save cost. This provides an advance over the trivial solution of putting a logo inserter in front of the encoder and package them together.

Moreover, it is not necessary to provide position coordinates for the logo if a fixed position within a frame is assumed.

Accordingly, it can be seen that the present invention provides an encoder and encoding method for inserting logos into a digital television signal. An alpha blending function receives logo image and logo alpha map data for blending with input video data. The input video is retrieved from a frame buffer, and written back to the frame buffer after blending with the logo data. Subsequently, the frame buffer contents, including the portion with the blended logo data, is provided to a pre-processing function for filtering and film mode detection. If the frame is determined to be a film mode frame, a drop field decision is provided from the pre-processing function to the frame buffer to drop the redundant field.

The pre-processed video data that is output from the pre-processing function is then provided to subsequent compression components for conventional processing, such as motion compensation.

In an HDTV embodiment, a number of compressors are provided which each receive a portion (e.g., panel) of a video frame. The data stored in each frame buffer therefore comprises a corresponding portion of a frame.

By incorporating the logo insertion into the front end of the encoder/compressors and sharing the frame buffer between the logo inserter and the video preprocessor, there is no need for a separate logo inserter with a separate frame buffer, so encoding cost are reduced.

Although the invention has been described in connection with various specific embodiments, those skilled in the art will appreciate that numerous adaptations and modifications may be made thereto without departing from the spirit and scope of the invention as set forth in the claims.

For example, while the invention was discussed in connection with a cable or satellite television broadband communication networks, it will be appreciated that other networks such as local area networks (LANs), metropolitan area networks (MANs), wide area networks (WANs), internets, intranets, and the Internet, or combinations thereof, may be used.

Moreover, the invention may be implemented using any known hardware, firmware and/or software techniques.

What is claimed is:

1. A method for providing a logo image insertion capability at a video encoder by sharing a common video capture frame buffer, comprising the steps of:
   (a) storing data in the frame buffer of said encoder from an input digital video picture in which the logo image is to be provided;
   (b) providing image data and alpha map data that are associated with the logo image to a logo image insertion memory of said encoder;
   (c) providing at least a portion of the data of the input digital video picture from a corresponding storage location of the frame buffer to an alpha blending function of said encoder that is associated with the logo image insertion memory for blending with the image data in accordance with the alpha map data to provide blended data; and
   (d) storing the blended data in the frame buffer by overwriting the corresponding storage location of the frame buffer.

2. The method of claim 1, comprising the further step of:
   (e) retrieving the blended data from the frame buffer for compression processing to provide corresponding compressed video data for forming a packetized compressed bitstream.

3. The method of claim 1, comprising the further step of:

switching between pre-calculated logo images for insertion into successive input digital video pictures by providing corresponding image data and alpha map data to the memory for each successive picture.

4. The method of claim 1, comprising the further step of:

determining whether the data stored in the frame buffer comprises film mode data, and if so, sending a signal to the frame buffer to drop redundant field data therein so that blending for the redundant field data at the alpha blending function is skipped.

5. The method of claim 1, wherein:

the input digital video picture comprises Standard Definition Television (SDTV) data.

6. The method of claim 1, comprising the further step of:

providing a control signal for synchronizing said steps (b) and (c).

7. The method of claim 1, wherein:

the data provided from the frame buffer to the alpha blending function in said step (c) is only a portion of the data stored in the frame buffer.

8. The method of claim 1, wherein:

the alpha map data comprises a plurality of different pre-calculated alpha maps for achieving a dissolve effect for successive input digital video pictures.

9. The method of claim 1, comprising the further steps of:

providing coordinate data that is associated with the logo image to the frame buffer; and selecting the data of the input digital video picture that is to be provided to the alpha blending function in accordance with the coordinate data.

10. The method of claim 9, wherein:

the coordinate data is defined based on the video picture as a whole.

11. The method of claim 9, wherein:

the coordinate data is defined relative to the portion of the input digital video picture in which the logo image is to be provided.

12. The method of claim 1, comprising the further step of:

subdividing the input digital video picture into a plurality of panels;

wherein the logo image extends across at least two of the panels, and the data stored in the frame buffer in said storing step corresponds to one of the panels.

13. The method of claim 12, wherein:

the at least two panels in which the logo image is provided are partially overlapping.

14. The method of claim 1, wherein:

the input digital video picture comprises High Definition Television (HDTV) data.

15. An apparatus for providing a logo image insertion capability at a video encoder by sharing a common video capture frame buffer, comprising:

a frame buffer provided at said encoder for storing an input digital video picture in which the logo image is to be provided;

a logo image insertion memory provided at said encoder for storing image data and alpha map data that are associated with the logo image;

an alpha blending function provided at said encoder and associated with the logo image insertion memory;

means for providing at least a portion of the data of the input digital video picture from a corresponding storage location of the frame buffer to the alpha blending function for blending with the image data in accordance with the alpha map data to provide blended data; and means for storing the blended data in the frame buffer by overwriting the corresponding storage location of the frame buffer.

16. The apparatus of claim 15, further comprising:

means for retrieving the blended data from the frame buffer for compression processing to provide corresponding compressed video data for forming a packetized compressed bitstream.

17. The apparatus of claim 15, further comprising:

means for switching between pre-calculated logo images for insertion into successive input digital video pictures by providing corresponding image data and alpha map data to the memory for each successive picture.

18. The apparatus of claim 15, further comprising:

means for determining whether the data stored in the frame buffer comprises film mode data, and if so, sending a signal to the frame buffer to drop redundant field data therein so that blending for the redundant field data at the alpha blending function is skipped.

19. The apparatus of claim 15, wherein:

the input digital video picture comprises Standard Definition Television (SDTV) data.

20. The apparatus of claim 15, further comprising:

a controller for providing a control signal for synchronizing a communication of the image data and alpha map data to the logo image insertion memory for storing thereat with the providing means.

21. The apparatus of claim 15, wherein:

the data provided from the frame buffer to the alpha blending function by the providing means is only a portion of the data stored in the frame buffer.

22. The apparatus of claim 15, wherein:

the alpha map data comprises a plurality of different pre-calculated alpha maps for achieving a dissolve effect for successive input digital video pictures.

23. The apparatus of claim 15, further comprising:

a controller for providing coordinate data that is associated with the logo image to the frame buffer; and means for selecting the data of the input digital video picture that is to be provided to the alpha blending function in accordance with the coordinate data.

24. The apparatus of claim 23, wherein:

the coordinate data is defined based on the video picture as a whole.

25. The apparatus of claim 23, wherein:

the coordinate data is defined relative to the portion of the input digital video picture in which the logo image is to be provided.

26. The apparatus of claim 15, further comprising:

means for subdividing the input digital video picture into a plurality of panels;

wherein the logo image extends across at least two of the panels, and the data stored in the frame buffer corresponds to one of the panels.

27. The apparatus of claim 26, wherein:

the at least two panels in which the logo image is provided are partially overlapping.

28. The apparatus of claim 15, wherein:

the input digital video picture comprises High Definition Television (HDTV) data.

* * * * *